United States Patent Office 3,510,388
Patented May 5, 1970

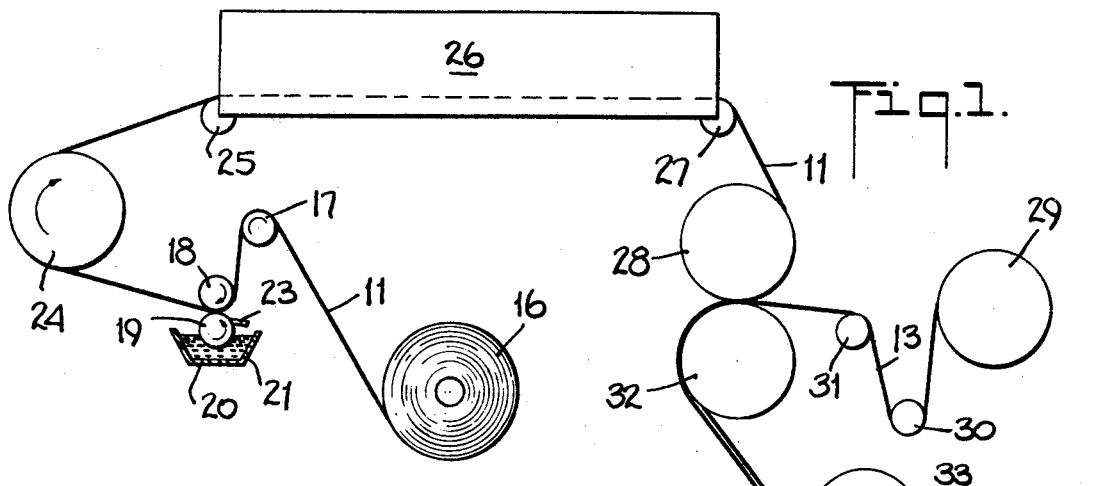
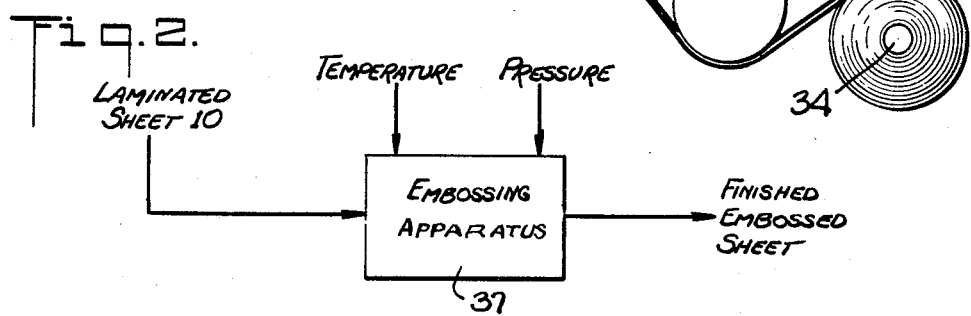
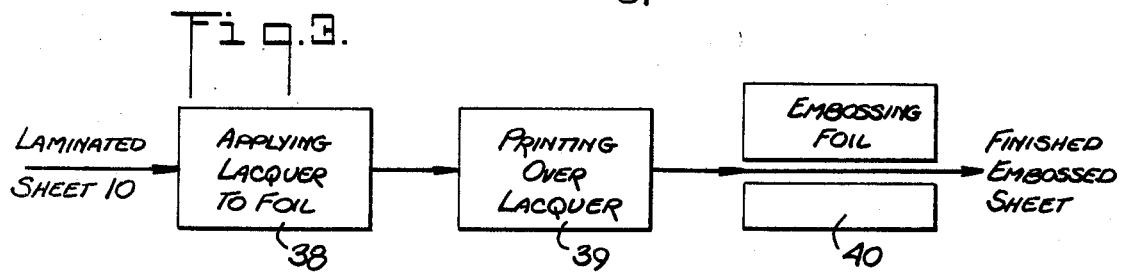
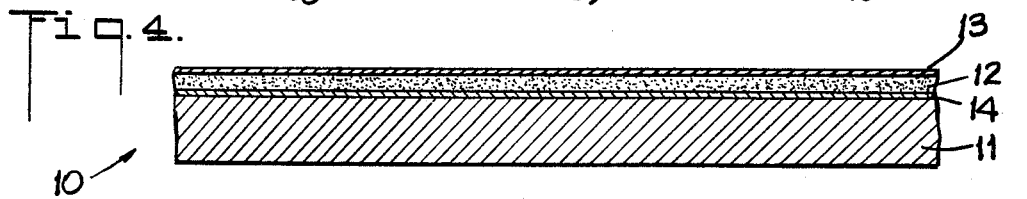
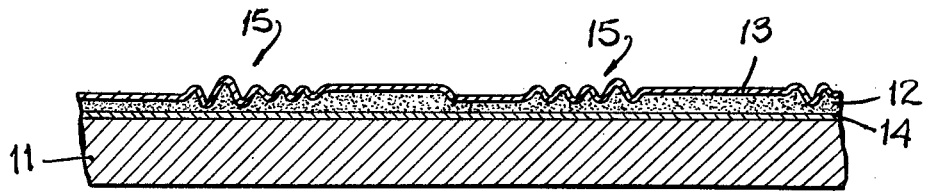

3,510,388
EMBOSSABLE SHEET MATERIAL
Walter A. Hunt, Spring Lake, and Leroy C. Hofmann, Saddle River, N.J., assignors to Consolidated Aluminum Corporation, Jackson, Tenn., a corporation of New York
Filed Nov. 1, 1965, Ser. No. 505,844
Int. Cl. B32b 15/08
U.S. Cl. 161—119
13 Claims

ABSTRACT OF THE DISCLOSURE

The disclosure relates to a multilayer embossable material which includes a base layer of paper having one surface sufficiently impervious so that when a vinyl compound is disposed thereon, the vinyl compound will form a substantially flat layer to which a sheet of metal foil is subsequently adhered. The embossable multilayer material provides for highly decorative designs to be embossed thereon and be substantially scratch resistant at normal room temperatures. Further, the decorative embossed material is characterized by the fact that the deforming of the metal foil occurs in the vinyl embossing bed without any resultant fracturing of the base paper layer.

---

This invention relates to an embossable material which is sufficiently hard at room temperature to resist scratching or marring of the embossed surface and yet which can be softened at an elevated temperature in order to enable the material to be embossed.

In the prior art, embossable sheet material has been conventionally formed from a base layer of paper material, an intermediate layer of wax material and a foil layer adhered to the wax. Since the wax is soft even at room temperature, it can be readily embossed. The embossed sheets are commonly used where it is desired to have a grained surface which contains a particular design pattern or which portrays the various elements of a pictorial scene. Embossed material is extensively used in the preparation of greeting cards, advertising material such as brochures, decorative packaging material and the like.

Although the softness of the intermediate layer of wax has the advantage of facilitating the embossing of the foil since the wax can be deformed by the embossing die with a minimum of pressure, the softness of the wax also results in its great weakness since it enables the finished product to be easily scratched, marred or delaminated. As a result, even the slightest pressure on the foil surface of the finished embossed sheet can permanently disfigure it. This is especially true wherever the sheet material must be handled, such as in the case of greeting cards, brochures, packaging and the like, since practically any contact with the embossed surface during handling, inevitably results in the embossed surface being scratched or marred.

It is therefore an object of the invention to provide an embossable material which is hard enough to resist scratching, marring and delamination of the embossed surface and yet at the same time can be softened sufficiently to simplify the embossing operation.

It is another object of the invention to provide an embossable material which can be sufficiently softened at a moderately elevated temperature in order to permit the material to be embossed.

It is still another object of the invention to provide an embossable material in which the intermediate layer between the foil and the base material can be applied with sufficient thickness in one fabricating operation.

In one embodiment of the invention the embossable material comprises a layer of paper material having a substantially impervious surface, a coating of a vinyl compound disposed upon the impervious surface of the paper material, and a layer of foil material overlying and adhered to the vinyl coating. With this arrangement, the layer of foil material is adapted to be embossed when the vinyl coating is softened by heat. An advantage of the embossable material is that the vinyl coating is sufficiently hard at room temperature to resist scratching and marring and yet it can be readily embossed when softened at a moderately elevated temperature.

In another embodiment of the invention the vinyl compound of the intermediate layer includes a polyvinyl chloride solution having a comparatively high percentage of solids in its contents so that a relatively thick coating can be applied to the paper material during a single application.

In still another embodiment of the invention the paper material has a substantially impervious surface for receiving the intermediate layer. The impervious surface prevents penetration of the dissolved thermoplastic material of the intermediate layer into the paper base material so that a uniform and continuous surface for the intermediate layer can be obtained.

In an additional embodiment of the invention, the process of manufacturing embossable material includes the step of transferring dissolved thermoplastic material by a gravure process to the substantially impervious surface of the paper material to form a coating thereon. Transfer by the gravure process enables a sufficiently heavy or thick coating of thermoplastic material to be applied to the paper base material in a single operation and applies the thermoplastic material in a manner which is conducive to its extending into a continuous and uniform coating overlying the paper base material.

In still an additional embodiment of the invention the process includes the step of heating the paper material and the dissolved thermoplastic material after the dissolved thermoplastic has extended into a substantially uniform coating. This procedure enables a portion of the solvent to evaporate from the thermoplastic material before the heating operation and also contributes to the obtaining of a uniform and continuous coating since all of the solvent need not be evaporated during the heating step.

In a further embodiment of the invention the process includes the step of placing a layer of foil material in an overlying contiguous relationship with the coating after the heating step. This method is possible since the coating remains tacky for a period of time after being removed from the heating step.

In still a further embodiment of the invention, the apparatus for manufacturing embossable laminated material includes means for transferring dissolved thermoplastic material by a gravure process to a substantially impervious surface of paper material to form a coating thereon. The apparatus further includes means for heating the paper material of the dissolved thermoplastic material after the dissolved thermoplastic material has extended into a substantially uniform coating in order to drive off the solvent from the coating. In addition the apparatus includes means for placing a layer of foil material in an overlying and contiguous relationship with the coating.

Other objects and features will become apparent in the following description and claims and in the drawings in which:

FIG. 1 is a representation of the apparatus of the invention for manufacturing embossable material;

FIG. 2 is a block diagram representing the process by which the embossable laminated sheet of the invention is embossed;

FIG. 3 is a block diagram representing the steps in applying lacquer to a foil of the embossable laminate of the invention prior to embossing;

FIG. 4 is an enlarged vertical section view showing the paper base material, the impervious coating for the paper base material, the intermediate thermoplastic layer, and the foil layer of the embossable material of the invention in an exaggerated manner; and FIG. 5 is a vertical section view of the embossable material of the invention subsequent to an embossing operation and showing the embossed foil and intermediate thermoplastic layers as well as the coating of the paper base material and the paper base material in an exaggerated form.

Embossable material 10 of the invention includes base layer 11 which can be any one of a variety of paper or board materials (FIG. 4). The embossable material further includes intermediate layer 12 which is formed by thermoplastic material. Foil 13 overlies and is adhered to the intermediate layer.

In order to obtain a satisfactory embossable material or laminate, it is necessary to insure that intermediate layer 12 forms a substantially uniform and continuous coating over base layer 11. Consequently, in forming intermediate layer 12 over base layer 11, any penetration of the thermoplastic material into the base layer can result in an uneven coating or one containing a plurality of voids. For this reason it has been found to be necessary in manufacturing the embossable material of the invention to employ a base layer having a surface which is substantially impervious to penetration by the thermoplastic material of the intermediate layer. By way of example, base layer 11 may include clay coating 14. The coating in order to be effective must be capable of filling the pores in the paper and thereby insure that a uniform and uninterrupted coating may be obtained. In addition, base layer 11 must be sufficiently rigid so that the paper is not indented or otherwise deformed during the embossing operation. Thus only the foil and the intermediate layer becomes indented by the embossing die. In this way it is insured that an accurate reproduction of the die is obtained during the embossing operation. Exceptionally smooth but uncoated paper material such as paper which has been "super-calendered" is not satisfactory for the product of the invention since even after "super-calendering," the pores of the paper are still open.

Intermediate layer 12 which receives the impression 15 formed in foil 13 during the embossing operation comprises thermoplastic material such as a polyvinyl chloride compound (PVC material). Investigations have shown that the optimum properties for the embossable material for the invention can be obtained by the use of PVC material in view of its physical properties, such as its range of softening temperatures, its hardness at room temperature, its ability to resist cracking, etc.

In order to achieve volume production of the material of the invention, a continuous flow manufacture process such as shown in FIG. 1 has been provided. Paper material or base layer 10 is advanced from supply roll 16 toward the apparatus of the invention. After passing over idler roll 17, base layer 11 travels downwardly and then between rolls 18 and 19. Roll 19 is a gravure roll which is adapted to appy ink or a coating to a surface in accordance with the intaglio process. Thus the surface of gravure roll 19 is covered with a plurality of indentations which are adapted to receive the dissolved thermoplastic material 20 from tank 21. It is sufficient to maintain the thermoplastic material in tank 21 at room temperature.

As shown in FIG. 1, gravure roll 19 rotates with its surface in contact with thermoplastic material 20 in tank 21. By means of doctor blade 23, which comprises a flexible thin strip riding along the surface of gravure roll 19, a portion of the thermoplastic material in tank 21 is transferred to the indentations in surface of base layer 11 as its passes about roll 18. Thus the doctor blade tends to distribute the thermoplastic material completely across the indentations in the gravure roll prior to the transfer operation. The indentations for gravure roll 19 can be applied with a density of about 30 lines per inch. When the base layer 11 passes between rolls 18 and 19, the thermoplastic material in the indentations of the gravure roll are transferred to base layer 11 in the form of dots of plastic. The passage of the coated base layer about roll 24 and the subsequent passage about roll 25 at the entrance of oven 26 corresponds to a predetermined period of time which is sufficient for the dots of thermoplastic material on the base layer to run together and uniformly coat the base layer as the solvent in the thermoplastic material begins to evaporate.

In the preferred form of the invention, the thermoplastic material which is utilized comprises a polyvinyl chloride compound which includes a much greater percentage of solids than that conventionally found in PVC compounds which are suitable for coatings, adhesives, or laminates. Customarily PVC compounds for coatings, adhesives and laminates contain about 30% solids, that is to say the solids represent 30% of the weight of the PVC compound in solution with the solvent. In the preferred form of the invention, the PVC compound contains about 50% solids, that is to say 50% of the dissolved PVC solution is solids.

The advantage of using a PVC compound about 50% solids is that it can be conditioned to be applied to the base layer with a moderately high viscosity such as that found in paint. As a result, with the PVC having a substantially high percentage of solids and being of the consistency of paint, it is possible to lay down a comparatively thick coating of PVC material during a single pass of base layer 11 over gravure roll 19.

The PVC material in tank 21 is dissolved in a solvent such as that containing ketones. During the travel from between gravure roll 19 and roll 18 which is formed from a resilient material such as rubber, as base layer 11 advances toward the entrance to oven 26, the solvent, due to its volatile nature, evaporates and at the same time the dots of PVC material blend into one another and form a continuous and uniform coating overlying base layer 11. If the coated base layer were to be admitted directly into the oven from gravure roll 19 without a predetermined period of travel during which the solvent begins to evaporate, the rapid evaporation of all the solvent in the oven could serve to blister or otherwise disfigure the PVC coating on the base layer.

Tests have shown that in the preferred form of the product of the invention, it is necessary to apply the PVC material at the rate of about 10 to about 15 pounds of PVC material to one surface of a ream of paper where a ream is defined as 500 sheets, each of which are 24 by 36 inches. In order to insure that there is sufficient thickness to the intermediate layer, it is not advisable to apply the PVC material at a rate of less than about 10 pounds per ream.

A specific example of a type of PVC compound which is suitable for the product of the invention is as follows.

Material: Polyvinyl chloride.
Color: Clear.
Viscosity: $33 \pm 3$ Zahn #4 (cup).
Weight per gallon: 8.1 lbs.
Total solids: $50 \pm 2\%$.
Appropriate thinner: Methyl ethyl ketone.

PVC material corresponding to the example set forth above can be obtained from Interchemical Corporation, Finishes Division, Elizabeth, N.J., under the designation No. 6-30193 Lamination Coating (a modification of No. 1-19449A).

With respect to the definition of the percent of solids in the thermoplastic material such as a PVC compound, it should be understood that "solids" refers to all ingredients of the compound with the exception of the solvent. In addition, when reciting the quantity of PVC material which is applied to a ream of paper or board material, it should be noted that the figure of 10 to 15 pounds per ream is referring to the solids of the PVC material without the solvent.

After the period of initial evaporation of the solvent during the passage of base layer 11 about roll 24 and roll 25, the base layer enters oven 26 for the removal of the remainder of the solvent. The atmosphere in the oven is maintained in the range of about 275° to about 300° F. By way of example, an oven having a length of 22 feet, when maintained at about 275° F., is capable of vaporizing the solvent in the coating of the base layer as it moves at the rate of about 30 yards per minute through the oven. Suitable vents (not shown in FIG. 1) are provided to carry off the vaporized solvent from oven 26.

The coated base layer 11 leaves oven 26 at roll 27 and passes over roll 28. At this point foil material is delivered from supply roll 29 and over rolls 30 and 31 to roll 32 adjacent to roll 28. The coated base layer 11 having the PVC coating thereon is brought into contact with foil 13 as the base layer 11 and foil 13 pass between rolls 28 and 32. Beyond roll 32 the combined embossable material or laminate is advanced toward roll 33 and then is wound on take-up shaft 34.

The PVC material 12 on base layer 11 remains tacky as it is advanced from oven 26 so that foil 13 can be readily adhered to the base layer. Inspection of PVC material 22 at base layer 11 as it advances from oven 26 shows that the PVC material is formed in a glossy flat coating over the base layer. Throughout the process the base layer is maintained under some tension and is supported on idler rolls such as roll 17 in order to maintain the support and tension. Prior to winding the embossable material 10 about take-up shaft 34, the embossable material can be cooled by providing roll 33 with cooling equipment such as by the use of water-cooling. Roll 32 which is adjacent to roll 28 and which serves to deliver the foil 13 to the point of joining with coated base layer 11 is a heated metal roll.

It can be seen that the process of the invention is capable of providing a sufficiently heavy coating or intermediate layer 12 during a single pass of base layer 11 adjacent to gravure roll 19.

Foil 13 is preferably an annealed aluminum foil, that is to say a dead-soft foil. The thickness of the foil is preferably in the range extending from about .00025" to about .0005" but more specifically the preferred range is about .0003" to about .00035". Experience has shown that above about .00035" the obtainable detail in the embossing suffers and this is particularly true if foil of a thickness as great as .001" was to be employed.

Further by way of example when using foil in the range of about .00025" to .0005", the paper board or base layer 11 preferably has a thickness in the range of about .0022" to .024". A paper of this caliper corresponds to about 45 lbs. per 1,000 square feet. In selecting the base layer paper or board, the chief determinant is that its coated surface provide a substantially smooth uninterrupted surface which enables a smooth uninterrupted intermediate layer of PVC material to be formed in an overlying relationship therewith.

As shown in FIG. 2 prior to embossing a laminated sheet of the embossable material of the invention, the sheet is placed upon a heated die mounted on the heated platen of an embossing apparatus. Thus, as shown in the block diagram of FIG. 2, block 37 represents the embossing apparatus in which, the embossing operation is performed by the application of elevated temperature and pressure to the foil.

By way of example, the platen of the embossing apparatus and the die mounted upon the platen are maintained at a temperature in the range of about 230° to about 250° F. The PVC material of the intermediate layer is not only conditioned to have a solids content of about 50% but it is also conditioned to have a softening range in the temperature range of from about 230° to about 250° F. when accompanied by a dwell of approximately one-half second and by light pressure.

Contrary to wax intermediate layers, the PVC intermediate layer of the invention cannot be embossed by the platen unless the platen is heated. For the same reason, however, after embossing the hard characteristic of the PVC intermediate layer resists scuffing and marring of the embossed surface so that a substantially permanent embossed surface is obtained. Again due to the range of thickness of the film taken in conjunction with the thickness and the physical characteristics of the PVC intermediate layer, it is possible to obtain grain or detail corresponding to about 120 lines per inch. This represents a range which overlaps that which can be obtained with wax intermediate layers. In performing the embossing operation, care must be taken that temperatures in excess of about 250° F. are not encountered since excessive temperature levels can possibly warp the embossing press and also cause the generation of steam which can shrink and thereby damage the foil layer of the embossable material.

In many instances it is desired to augment the decorative effect of the embossing by the application of colors to the embossed surface. By the provision of a coating of lacquer of the nitrocellulose type over the foil prior to embossing, an anchoring surface can be provided on the foil to which printing can be subsequently applied. The lacquer selected for the foil must be capable of withstanding the level of temperature present during the process of the invention and at the same time must be substantially flexible in order not to interfere with the embossing operation. In the case of the preparation of decorative material, printing such as color printing is applied to the lacquer coating. Of course, it is also possible to have the step of printing follow the step of embossing. The overall requirement for the lacquer to be used prior to printing is that the lacquer must be a thermosetting type of lacquer such as nitrocellulose and not a thermoplastic lacquer such as vinyl, since the softening temperature of thermoplastic materials would be met or exceeded by the embossing process and would thereby affect or destroy any thermoplastic coating.

One sequence of printing the embossed product is shown in FIG. 3. Here laminated sheet 10 is first subjected to the step of applying lacquer to foil 13 as shown in block 38. After the lacquer is applied to the foil, the sheet is then subjected to the step of printing over the lacquer as shown in block 39. The final operation comprises that of embossing the surface of the sheet which contains the printed matter over the coating of lacquer. This step is shown as block 40 in FIG. 3.

What is claimed is:

1. An embossable material comprising a layer of paper material, a coating of vinyl chloride compound forming an embossing bed of predetermined thickness disposed upon one surface of said paper material, said predetermined thickness resulting from the application of said vinyl compound in the amount of about 10 to 15 pounds per ream of said paper material, a ream being defined as 500 sheets of said paper material each measuring approximately 24 x 36 inches, said one surface being substantially impervious to said coating, and a layer of metal foil material overlying and adhered to said coating, said layer of foil material being adapted to be embossed upon the application of pressure thereon when said vinyl coating is softened by heat, said predetermined thickness of said embossing bed enabling said embossing bed to contain substantially all of said layer of foil material after the embossing thereof and to prevent fracturing of said paper material.

2. An embossable material in accordance with claim 1 in which said layer of paper material having a substantially impervious surface comprises a coated paper material.

3. An embossable material in accordance with claim 1 in which said layer of paper material having a substantially impervious surface comprises paper material having a clay coating disposed on one side thereof, said paper material having a thickness in the range of about .0022 to about .024 inch with said embossable material being flexible and relatively scratch resistant at room temperature.

4. An embossable material in accordance with claim 1 in which the vinyl compound of said coating when in the liquid state comprises a polyvinyl chloride solution with a solids content in the range of approximately 50% of the solution.

5. An embossable material in accordance with claim 1 in which said coating of a vinyl compound comprises polyvinyl chloride material having a softening temperature in the range extending from about 235° F. to about 250° F.

6. An embossable material in accordance with claim 1 in which said layer of foil material has a thickness in the range of about .00025 to about .0005 inch.

7. An embossable material in accordance with claim 1 in which said layer of foil material comprises fully annealed dead soft aluminum foil having a thickness in the range of about .00025 to about .00035 inch.

8. An embossable material in accordance with claim 1 and further comprising a coating of thermosetting lacquer overlying said foil material, said coating being adapted to provide a base for printing and a decorative covering for said foil material.

9. An embossable material in accordance with claim 8 in which said lacquer comprises nitrocellulose lacquer.

10. An embossable material comprising a layer of paper having a clay coating disposed on at least one surface thereof, said paper layer having a thickness in the range of about .0022 to about .024 inch, a substantially flat layer of polyvinyl chloride material having a softening temperature in the range extending from about 230° F. to about 250° F. disposed upon said clay coated surface of said paper layer, said polyvinyl chloride material having been applied to said paper layer in the ratio of about 10 to about 15 pounds of polyvinyl chloride material per ream, a ream being defined as 500 sheets each measuring 24 x 36 inches, and a layer of soft metal foil material having a thickness in the range of about .00025 to about .0005 inch which is capable of being embossed and maintain its detail with a grain corresponding to about 120 lines per inch, said polyvinyl chloride layer providing an embossing bed of predetermined thickness which when softened by heat allows said foil layer to be embossed, the predetermined thickness of said embossing bed enabling said embossing bed to contain substantially all of said layer of foil material after the embossing thereof.

11. An embossable material in accordance with claim 10 and further comprising a coating of thermosetting lacquer overlying said foil material, said coating being adapted to provide a base for printing and a decorative covering for said foil material.

12. An embossable material in accordance with claim 11 in which said lacquer comprises a nitrocellulose lacquer.

13. An embossed material comprising in combination a layer of paper material, a coating of vinyl chloride compound forming an embossing bed of predetermined thickness disposed upon one surface of said paper material, said predetermined thickness resulting from the application of said vinyl compound in the amount of about 10 to 15 pounds per ream of said paper material, a ream being defined as 500 sheets of said paper material each measuring approximately 24 x 36 inches, said one surface being substantially impervious to said coating, and a layer of metal foil material overlying and adhered to said coating, said layer of foil material containing an embossed design applied thereto by the application of pressure thereon when said vinyl coating was softened by heat, said predetermined thickness of said embossing bed enabling said embossing bed to contain substantially all of said layer of embossed foil material without any fracturing of said paper material.

References Cited
UNITED STATES PATENTS

| | | | |
|---|---|---|---|
| 2,095,879 | 10/1937 | Kittredge et al. | 161—218 XR |
| 2,205,466 | 6/1940 | Caprio et al. | |
| 2,209,530 | 7/1940 | Mason | 161—216 |
| 2,544,146 | 3/1951 | Erikson | 161—218 XR |
| 2,768,460 | 10/1956 | Northrup | 40—135 |
| 2,992,936 | 7/1961 | Rowland | 117—152 XR |

ROBERT F. BURNETT, Primary Examiner

R. H. CRISS, Assistant Examiner

U.S. Cl. X.R.

40—136; 161—218, 251